Figure 1:
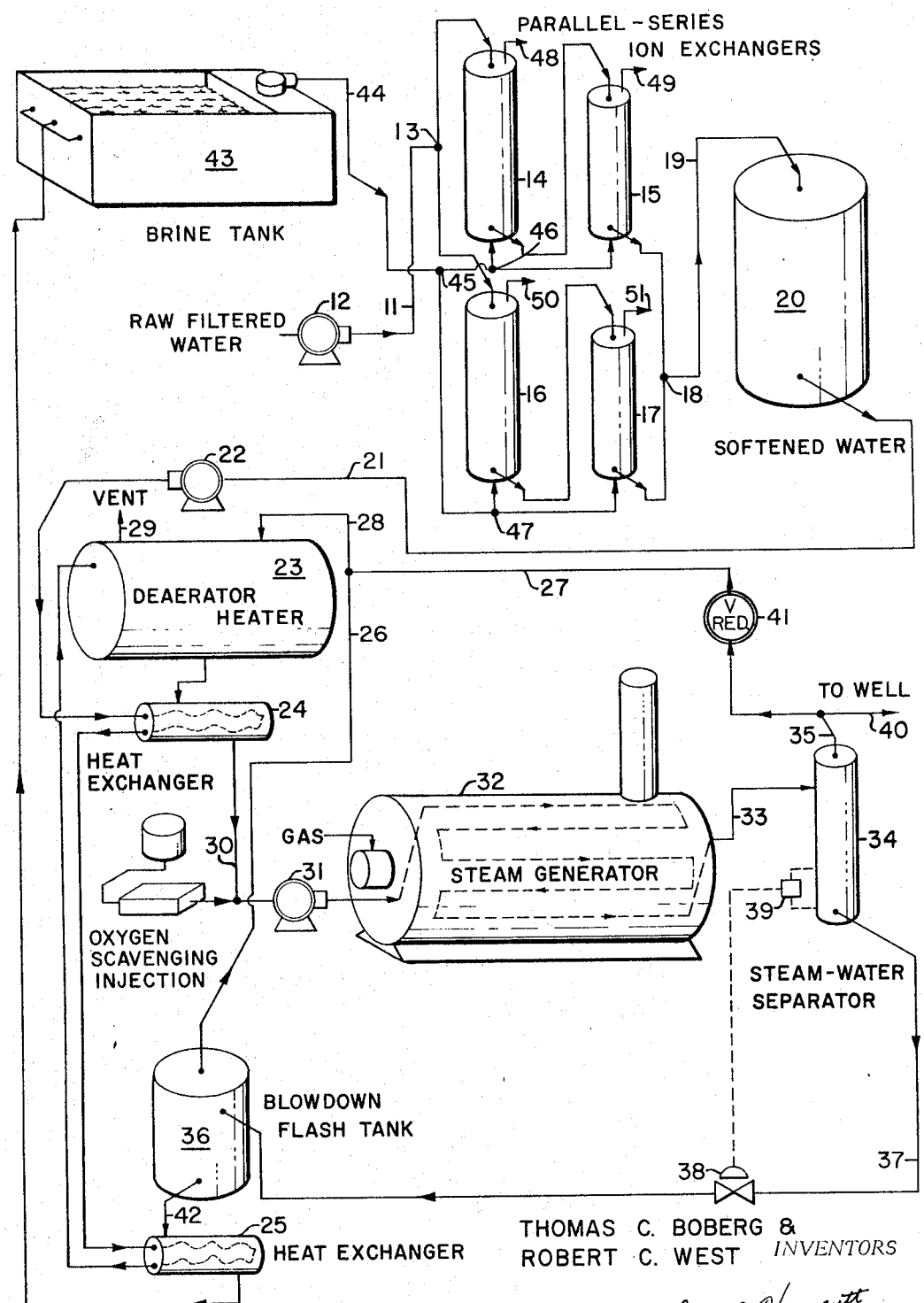

Jan. 17, 1967     R. C. WEST ET AL     3,298,359
STEAM GENERATION SYSTEM AND METHOD OF GENERATING STEAM
Filed May 24, 1965     2 Sheets-Sheet 2

THOMAS C. BOBERG &
ROBERT C. WEST     INVENTORS

BY Gary C. Honeycutt
ATTORNEY

United States Patent Office 3,298,359
Patented Jan. 17, 1967

3,298,359
STEAM GENERATION SYSTEM AND METHOD
OF GENERATING STEAM
Robert C. West and Thomas C. Boberg, Houston, Tex.,
assignors to Esso Production Research Company, a
corporation of Delaware
Filed May 24, 1965, Ser. No. 458,020
10 Claims. (Cl. 122—379)

This invention relates to the high capacity generation of steam at elevated pressures, such as needed in the thermal stimulation of oil wells and in the steam flooding of oil reservoirs. In a particular aspect, the invention is concerned with a method and apparatus for the operation of ion exchange towers used to soften the feed water for such steam generation. In a specific embodiment, the invention is directed to the processing of the underflow water from a steam separator, in preparation for its use in the regeneration of such ion exchange towers.

In the recovery of heavy petroleum crude oils from wells, the industry has for many years recognized the desirability of thermal stimulation and steam flooding as a means of lowering the oil viscosity and thereby increasing a well's productivity. A form of thermal stimulation which has recently received wide acceptance by the industry is the process of injecting steam in the well and into the reservoir for a limited period of time and then allowing the well to produce. Subsequent cycles of steam injection and oil production are repeated as necessary. The steam stimulation of an oil well in this manner typically requires a steam generation capacity of about 5,000 to 50,000 pounds per hour or more.

A major problem in achieving continuous high capacity steam generation is the requirement that the feed water passed to the steam generators be low in oxygen content, low in total hardness, and have a pH of 7 to 11, to avoid fouling the generator coils by corrosion or the accumulation of boiler scale and other deposits. A particularly suitable means for softening the feed water is to pass raw filtered water through a series of ion exchange towers. Typically, the ion exchange resin or zeolite used for this purpose is initially supplied in the sodium form. As the raw filtered water passes through the ion exchange towers, calcium and magnesium and other undesirable ions are exchanged for sodium ions. In consequence, the effluent from the ion exchange towers is softened, i.e., made calcium- and magnesium-free. The ion exchange towers must thereafter be regenerated from time to time to restore the resin or zeolite to its sodium form. Normally, a sodium salt in solution, preferably sodium chloride, is used for this purpose.

It is an object of the present invention to achieve an efficient regeneration of ion exchange towers used in the pretreatment of steam generator feed water, while at the same time minimizing or eliminating the need for an extraneous supply of sodium chloride. More particularly, it is an object of the invention to provide an improved method and apparatus for the efficient recovery and recycle of soft brine for the regeneration of the ion exchange towers, by processing the underflow water from the steam separator.

In accordance with one embodiment of the invention, the underflow from the steam separator is passed to a flash tank for the removal of low pressure steam, and the remaining water phase is passed to an auxiliary boiler for further concentration of the dissolved solids contained therein. In accordance with an alternate embodiment of the invention, the flash tank bottoms are recycled through the main steam generator for an initial period until the dissolved solids content of the flash tank bottoms is increased to a concentration which is suitable for the regeneration of the ion exchange towers.

Figure 2:
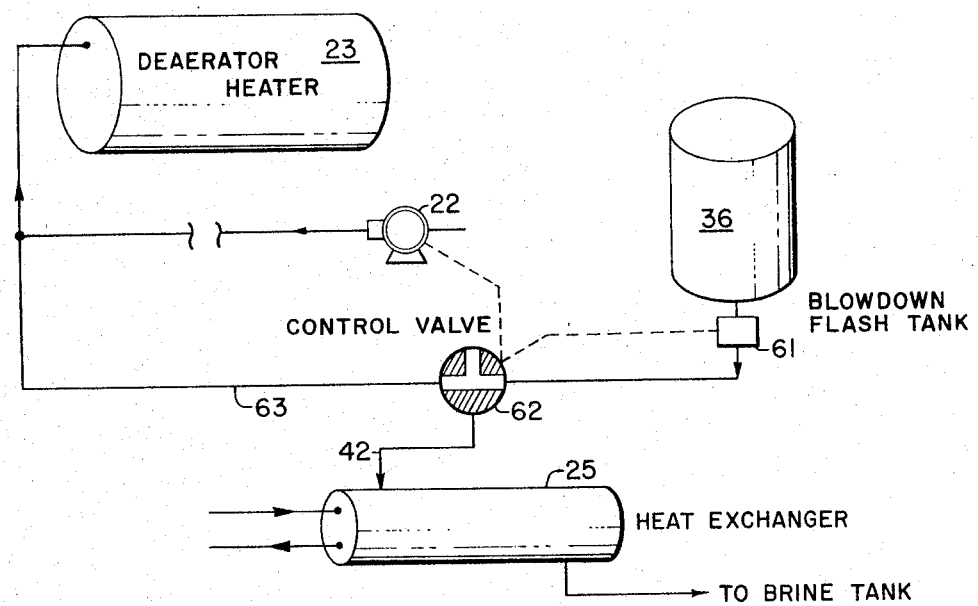
Figure 3:
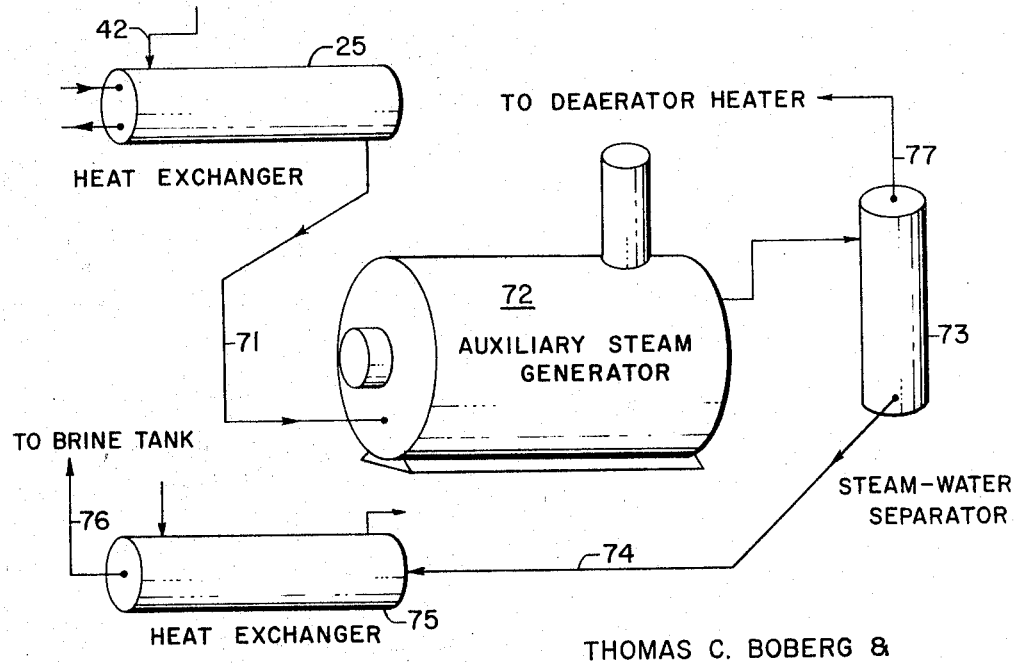

FIGURE 1 is a schematic flow process diagram illustrating one embodiment of the invention.
FIGURE 2 is a process flow diagram showing a first modification of the embodiment of FIGURE 1.
FIGURE 3 is also a process flow diagram, illustrating an alternate modification of the embodiment of FIGURE 1.

As illustrated by FIGURE 1, raw filtered water is passed through line 11 by means of pump 12. The feed stream is divided at junction 13 and is then passed, in parallel-series flow, through ion exchange towers 14, 15, 16, and 17. Each of the ion exchange towers is packed with a cationic exchange resin or zeolite, such as Dowex 50 of Dow Chemical Company or Amberlite 100 of Rohm & Haas Company. Dowex 50 is a sulfonated copolymer of styrene and divinylbenzene. Amberlite 100 is a sulfonated phenol-formaldehyde resin. The ion exchange towers function to remove calcium and magnesium salts, and minor amounts of other dissolved salts which contribute to total hardness. The arrangement of the towers, and the manner of placing the ion exchanger therein, depends in part upon the quality of the water to be treated. Such arrangement and handling of the resin or zeolite are well known to those skilled in the art.

The softened effluent from the ion exchange towers is combined at junction 18 and passed through line 19 to storage tank 20. As needed, softened water is then passed from tank 20 through heat exchangers 24 and 25 before entering deaerator-heater 23. Additional heat for deaeration of the feed water is supplied to heater 23 as steam passing through line 28. The expelled air and other gaseous impurities are vented through line 29. The softened deaerated water is then passed through heat exchanger 24, line 30, and pump 31 to a gas-fired steam generator 32. The effluent from the steam generator, passing through line 33, generally consists of 70–90% quality steam. In separator 34, the effluent is separated into 98–99% quality steam passing overhead through line 35, with underflow water being passed to blow-down flash tank 36 by means of line 37 and valve 38, the latter being controlled by liquid level sensing means 39. The major proportion of the steam produced is passed by way of line 40 to the well or wells being stimulated. A minor proportion of the steam is passed by means of valve 41 and line 27 to the deaerator heater as previously indicated, to supply necessary heat to the deaerator heater. The low pressure blow-down steam passes overhead from tank 36 through line 26 where it is combined with steam from line 27 and passed through line 28 to the deaerator heater, also as previously indicated. The underflow from tank 36 is passed through line 42 to heat exchanger 25 and is then passed to brine tank 43.

Periodically, the ion exchange resin or zeolite contained in towers 14, 15, 16, and 17 becomes exhausted or saturated with calcium and magnesium ions and other cations which contribute to hardness. At such times, flow through line 11 and pump 12 is diverted to one set of series towers 14 and 15 or 16 and 17. Regeneration is achieved for the towers off line by passing brine from tank 43 through line 44. The brine is directed by a valve at junction 45 to the set of towers undergoing regeneration, and the regeneration effluent is discharged through either lines 48 and 49 or 50 and 51. The operation, of course, can be varied to suit the indicated tower arrangement as known to those skilled in the art.

In FIGURE 2, another modification of the embodiment of FIGURE 1 is shown. In this system, the bottoms removed from flash tank 36, or a portion thereof, is passed through electrical conductivity cell 61, which determines the total dissolved solids content of the bottoms stream. Control valve 62, located in line 63, is operated in response to the conductivity determination, whereby the bottoms stream from tank 36 is recycled through deaerator-heater 23 in response to a conductivity measurement which corresponds to a dissolved solids content below a predetermined value. This control system also actuates pump 22, such that as valve 62 opens, flow through pump 22 is cut by corresponding amount. Thus, total input flow to deaerator 23 is held constant.

A recycle of the bottoms stream in this manner achieves a progressively higher concentration of dissolved solids in the stream passed to generator 32 through line 30 by means of pump 31. As a result, the underflow from separator 34 also contains a progressively increased concentration of dissolved solids. Soon, the dissolved solids content in the underflow from flash tank 36 attains a level which is suitable for use in the regeneration of the ion exchange towers. At such time, control valve 62 is switched to its alternate position, thereby stabilizing flow through line 63 and diverting the proper amount of flash tank bottoms through line 42, heat exchanger 25, and then to brine tank 43.

FIGURE 3 represents a second modification of the embodiment shown in FIGURE 1. In accordance with this embodiment, the underflow from flash tank 36 is passed through heat exchanger 25 and line 71 into an auxiliary steam generator 72. The effluent from steam generator 72 is passed to separator 73. The underflow from separator 73 (passing through line 74) has, of course, an increased concentration of dissolved solids with respect to the stream passing through line 71. Stream 74, which now contains a suitable concentration of dissolved solids for use in the regeneration of the ion exchange towers, is passed through heat exchanger 75 and line 76 to brine tank 43. The overhead from separator 73 is passed through line 77 as a source of heat supplied to deaerator 23.

Referring again to FIGURE 1, a specific example of the invention involves the treatment of raw filtered water having the following approximate dissolved solids content:

*Table I.—Approximate composition of raw water*

[BASIS: 1 MILLION LBS. OF WATER]

| | Dissolved solids, lbs. |
|---|---|
| Sodium, $NA^{++}$ | 1175 |
| Calcium, $CA^{++}$ | 72 |
| Magnesium, $Mg^{++}$ | 140 |
| Bicarbonate, $HCO_3^-$ | 42 |
| Carbonate, $CO_3^=$ | 20 |
| Sulfate, $SO_4^-$ | 250 |
| Fluoride, $F^-$ | 1 |
| Chloride, $Cl^-$ | 2150 |
| Total | 3850 |
| Sp. Gr. | 1.002 |

Assuming generator 32 to be designed for an output of 30,000 lbs./hr. of 70–90% quality steam, then each of exchange towers 14 and 16 should have a capacity for treating about 60 gallons of raw water per minute. Such capacity is readily provided by 1.5 tons of zeolite or resin as the ion exchange medium. Each of exchange towers 15 and 17 should contain about 0.4 ton of zeolite. Consistent with this capacity of steam generation and ion exchange, storage vessel 20 should be of approximately 300 bbls. capacity.

Heat exchangers 24 and 25, and deaerator 23 are of conventional design having a capacity of 30,000 lbs. per hour.

A suitable steam generator 32, for example, is one which contains a forced circulation water vaporizer with a single pass helical continuous coil, either horizontal or vertical, with a maximum coil working pressure of 2500 p.s.i.g. Inlet water temperature to the generator is approximately in the range of 200–220° F.

The generator vessel is suitably equipped with a package burner assembly consisting of a burner, fuel firing equipment, combustion air fan, fan drive, flame safeguard, and safety equipment with combustion controls. The burner must have a heat release compatible with the feed water input to provide a maximum of 30,000 lbs./hr. of steam output. A suitable design burns natural gas with a net heating value of 1100 B.t.u. per s.c.f. Alternate burner systems may also be used which burn fuel oil, crude oil, or other combustible fluids.

Separator 34 is capable of discharging 10–30% of the steam-water mixture as underflow through line 37 with 98–99% quality steam passing overhead through line 35. Blow-down flash tank 36 is of conventional design having a capacity necessary to handle the underflow from separator 34 at a pressure of approximately 50 p.s.i.g.

With the system operating at capacity, the amount of regeneration brine supplied by tank 43 must be equivalent to about 1.2 short tons of 98% quality rock salt per day. In accordance with the present invention, the major proportion of brine used for regeneration is the recycle brine passing as underflow from flash tank 36 through line 42.

Referring again to FIGURE 2, the initial concentration of dissolved solids passing as underflow from flash tank 36 depends primarily upon the initial composition of the raw feed water. That is, some feed waters, in addition to hardness, contain substantial amounts of sodium chloride or other monovalent salts which do not contribute to total hardness. In the processing of raw feed water which contains more than about 0.4% of such salts, little or no recycle of flash tank bottoms by way of line 63 will be necessary. Specifically, a direct return of flash tank bottoms to the brine tank as shown by FIGURE 1 may suffice. However, the embodiment of FIGURE 2 is intended to insure the recovery of a soft brine having a sufficient concentration of salts for use as a regenerating medium in the event the underflow from the underflow of flash tank 36 does not initially contain a sufficient concentration of dissolved solids.

In order to determine the suitability of the flash tank bottoms for immediate recycle to brine tank 43, some analysis of the stream to determine its dissolved salt content is necessary. A suitable analysis is provided by a commercially available conductivity cell indicated diagrammatically at block 61. A suitable conductivity cell may be obtained from the Foxboro Co., as described in Foxboro Bulletin 19–13, or from Leeds and Northrup Co., as described in Data Sheet N–56(1).

Control valve 62 is shown in its recycle position as illustrated in FIGURE 2. This position corresponds to an analysis by cell 61 which indicates a dissolved solids content which is too low for passage to brine tank 43. Accordingly, the flash tank bottoms in line 42 are directed by way of line 63 back to deaerator 23 to be again passed through the steam generator along with additional feed water supplied by pump 22. In this regard, the operation of control valve 62 must be coordinated with pump 22 in order to provide the deaerator-heater 23 with a constant input flow rate corresponding to the desired output rate of steam through line 33. The coordination of control valve 62 with pump 22 is suitably achieved by transmitting the control signal from conductivity cell 61 simultaneously to both pump 22 and valve 62, as illustrated in FIGURE 2. For example, pump 22 may be an Oilwell Triplex plunger pump provided with a bypass on the pump discharge line with a control valve to regulate flow to the deaerator heater and steam generator.

The mixture of blow-down recycle in line 63 with softened feed water supplied by pump 22 provides an increased dissolved solids content in the charge to the steam generator. Correspondingly, an increased dissolved solids content is also provided in the generator effluent and the underflow from separator 34. A continued recycle of blow-down bottoms through the steam generator soon provides a concentration of dissolved solids in the flash tank bottoms which is suitable for the regeneration of the ion exchange towers. This increased concentration is readily detected by conductivity cell 61, in response to which valve 62 is switched to its alternate position, thereby discharging flash tank bottoms through line 42 for return to brine tank 43.

As an alternate embodiment, control valve 62 may be replaced by a continuous proportioning device whereby some fraction of the blow-down bottoms is continuously recycled and the remaining proportion continuously passed through heat exchanger 25 for return through line 42 for return to brine tank 43.

Referring again to FIGURE 3, the auxiliary steam generator is primarily intended for use in processing a raw feed water which is somewhat deficient in dissolved sodium or other monovalent salts, thereby requiring a substantial concentration of dissolved solids in the blow-down bottoms. In this embodiment, steam generator 72, for example, will have a capacity of about 6,000 lbs./hour to produce 70% quality steam at about 100 p.s.i.g. Accordingly, the dissolved solids concentration in line 74 will be approximately 2.3 times as great as the dissolved solids content passing through line 71 to the steam generator. In this manner, a continuous flow of soft regeneration brine through line 76 is possible even though the concentration in line 42 may be quite low.

In some instances, the brine recycled to tank 43 by way of line 42 (FIGURES 1 and 2) or by way of line 76 (FIGURE 3) may contain a concentration of sulfate ion which is sufficient to form a precipitate of calcium sulfate upon contact with the spent exchange resin. Preferably, therefore, the brine stored in tank 43 should periodically be tested, for example, by actual contact with a sample of spent ion exchange material in order to determine whether such a precipitate will form.

In the event the formation of calcium sulfate is found to occur, the sulfate ion is easily removed by passing the brine through an anionic resin using the salt-splitting technique. Salt splitting consists of regenerating a strong anionic resin with sodium chloride solution. The resin exchanges chloride ion for the bicarbonate silicas and sulfate ions. The spent resin, on contact with sodium chloride brine, is regenerated by releasing the entrapped ions in exchange for a new supply of chloride ions.

It is highly desirable in many instances to mount the entire system of the invention on a portable base, whereby the equipment may be moved from one location to the other, as needed. As an example of this, the complete system may be placed on a barge for use in the stimulation of offshore wells. In practice, such a barge-mounted installation would be towed to a well to be stimulated, and preferably to a well being produced by gas-lift. The gas-lift connection to the well would be transferred to the barge-mounted installation and connected to a turbo-expander mounted on the barge. The gas would then be passed through the deaerator to strip oxygen from the boiler feed water and then be passed into the boiler at a relatively low pressure. The power developed by the turbo-expander is thereby made available to operate the boiler feed water pump, fans, pumps for the water treating equipment, and for other miscellaneous uses.

For portable use on land, the entire system can readily be skid-mounted or placed on other mobile platforms in order to facilitate a transfer of equipment from one well site to another.

The following is claimed:

1. A process for the generation of steam from hard water comprising the steps of treating said water with a cationic exchange medium to produce softened water, deaerating said softened water, passing said softened deaerated water through a steam generation zone to produce a steam-water mixture, separating said mixture to produce high quality steam and water containing dissolved solids, concentrating said solution and contacting said cationic exchanger with the resulting concentrated solution, thereby regenerating at least a portion of said cationic exchange medium.

2. In a process for the generation of steam wherein hard water is softened prior to vaporization by means of a cationic exchange medium, the improved method for regenerating said cationic exchange medium which comprises passing the effluent from the vaporization zone to a steam-water separation zone, then concentrating the dissolved solids content of the resulting separated water, and passing the resulting concentrated stream in contact with said ion exchange medium for the regeneration thereof.

3. A method for the generation of steam from hard, brackish water which comprises the steps of passing said water in ion exchange contact with a cationic exchange medium, deaerating the resulting softened water, vaporizing a substantial proportion of the resulting softened deaerated water in a steam generation zone, separating the resulting steam-water mixture into high quality, high pressure steam and a soft water stream containing a substantial concentration of dissolved solids, flashing said separated water at a substantially reduced pressure with respect to the pressure of said steam generation zone, analyzing the liquid phase which remains after said flashing step to determine its suitability as a regeneration medium for said ion exchange medium, recycling said water phase to said steam generation zone in response to an analysis which shows the dissolved solids content of said water phase to be inadequate for such regeneration.

4. In a process for the generation of steam from hard, brackish feed water wherein said feed water is softened by contact with a cationic exchanger and is then passed to a steam generation zone, the improved method for regenerating said cationic exchanger which comprises separating the effluent from said steam generation zone into high quality steam plus a first separated water phase, flashing said first water phase at a substantially reduced pressure with respect to the pressure of said steam generation zone, thereby producing low pressure steam and a second separated water stream, analyzing said second separated water stream for dissolved solids content, and recycling said second separated water stream to said steam generation zone in response to an analysis indicating that the dissolved solids content of said second water stream is inadequate to provide suitable regeneration of said cationic exchanger, whereby a dissolved solids content of said second separated water phase is progressively increased, and contacting said cationic exchanger with said second separated water phase whenever the dissolved solids content thereof becomes adequate.

5. A method for the generation of steam from hard, brackish feed water which comprises passing said feed water in ion exchange contact with an ion exchanger, vaporizing a substantial proportion of the resulting softened water in a high pressure steam generation zone, separating the effluent from said steam generation zone into high quality, high pressure steam, and flashing said separated water at a substantially reduced pressure to produce low pressure steam and a water phase further concentrated in dissolved solids, passing the water phase from said flashing step to a low pressure steam generation zone, separating the resulting effluent into low pressure steam and water further concentrated in dissolved solids, and regenerating at least a portion of said ion exchanger with the resulting water phase from the step of separating the effluent from said low pressure steam generation zone.

6. Apparatus for the generation of steam from hard water comprising means for treating said water with a cationic exchange medium to produce softened water, means for deaerating the softened water, means for vaporizing a portion of said softened deaerated water at elevated pressure, means for separating the resulting steam-water mixture, means for concentrating the water phase separated from said mixture, and means for contacting said cationic exchange medium with the resulting concentrated solution.

7. In a system of apparatus for the generation of steam which includes means for softening hard water by contact with a cationic exchange medium, and means for vaporizing the softened water, the improved system for regenerating said cationic exchange medium which comprises means for separating the vaporization effluent to produce steam and a water phase containing dissolved salts, means for concentrating the salt content of said water phase, and means for passing the resulting concentrate in contact with said ion exchange medium for its regeneration.

8. Apparatus for the generation of steam from hard, brackish water which comprises means for passing said water in ion exchange contact with a cationic exchange medium, means for vaporizing a substantial proportion of the resulting softened water, means for separating the resulting steam-water mixture into high quality, high pressure steam and a soft-water stream containing a substantial concentration of dissolved solids, means for flashing said separated water at substantially reduced pressure with respect to the pressure existing in said means for steam generation, means for analyzing the liquid phase which remains after said flashing step to determine its suitability as a regeneration medium for said ion exchange material, and means for recycling said water phase to said means for vaporizing said softened water in response to an analysis which shows the dissolved solids content of said water phase to be inadequate for such regeneration.

9. In a system of apparatus for the generation of steam from hard, brackish feed water which includes means for softening said feed water by contact with a cationic exchanger and means for vaporizing at least a portion of said softened water, the improved system for regenerating said cationic exchanger which comprises means for separating an effluent from said vaporization means into high quality steam plus a first separated water phase, means for flashing said first water phase at a susbtantially reduced pressure with respect to the pressure of said steam generation zone, thereby producing low pressure steam and a second separated water stream, means for analyzing said second separated water stream for dissolved solids content, and means for recycling said second separated water stream to said vaporizing means in response to an analysis indicating that the dissolved solids content of said second water stream is inadequate to provide suitable regeneration of said cationic exchanger, and means for contacting said cationic exchanger with said second separated water phase whenever the dissolved solids content thereof becomes adequate for such regeneration.

10. Apparatus for the generation of steam from hard, brackish feed water which comprises means for passing said feed water in ion exchange contact with an ion exchanger, means for vaporizing a substantial proportion of the resulting softened water in a high pressure steam generation zone, means for separating the effluent from said steam generation zone into high quality, high pressure steam, means for flashing said separated water at a substantially reduced pressure to produce low pressure steam and a water phase further concentrated in dissolved solids, means for passing said water phase to a low pressure steam generation zone, means for separating the resulting effluent into low pressure steam and water further concentrated in dissolved solids, and means for regenerating a portion of said ion exchanger by contacting said ion exchanger with the resulting water phase produced by said means for separating the effluent from said low pressure steam generation zone.

References Cited by the Examiner
UNITED STATES PATENTS

| | | | |
|---|---|---|---|
| 1,895,635 | 1/1933 | McDonald | 122—1 X |
| 2,209,487 | 7/1940 | Wagner | 210—34 X |
| 2,312,570 | 3/1943 | Meier | 122—401 |

KENNETH W. SPRAGUE, *Primary Examiner.*